US012725926B2

(12) United States Patent
Ip et al.

(10) Patent No.: US 12,725,926 B2
(45) Date of Patent: Sep. 1, 2026

(54) ANTENNA SYSTEM, ANTENNA DEVICE, AND ANTENNA STRUCTURE

(71) Applicant: WISTRON NEWEB CORPORATION, Hsinchu (TW)

(72) Inventors: Sin Sze Ip, Hsinchu (TW); Wei-Shan Chang, Hsinchu (TW); Ting-Huei Chen, Hsinchu (TW); Chao-Tsu Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 74 days.

(21) Appl. No.: 18/806,789

(22) Filed: Aug. 16, 2024

(65) Prior Publication Data

US 2025/0087885 A1 Mar. 13, 2025

(30) Foreign Application Priority Data

Sep. 7, 2023 (TW) ................................ 112133962

(51) Int. Cl.
*H01Q 5/321* (2015.01)
*H01Q 5/35* (2015.01)
*H01Q 5/50* (2015.01)
*H01Q 23/00* (2006.01)

(52) U.S. Cl.
CPC ................. *H01Q 5/35* (2015.01); *H01Q 5/50* (2015.01)

(58) Field of Classification Search
CPC ...... H01Q 1/36; H01Q 1/2208; H01Q 1/2216; H01Q 1/2225; H01Q 1/241; H01Q 5/35; H01Q 5/50
See application file for complete search history.

(56) References Cited

U.S. PATENT DOCUMENTS

| | | | | |
|---|---|---|---|---|
| 6,853,341 B1 * | 2/2005 | Hellgren | .................. | H01Q 9/42 343/742 |
| 8,295,777 B1 * | 10/2012 | Yenney | ................. | H04W 24/06 455/442 |
| 2004/0135726 A1 * | 7/2004 | Shamir | .................. | H01Q 7/005 343/700 MS |

(Continued)

FOREIGN PATENT DOCUMENTS

TW 201027841 A 7/2010

*Primary Examiner* — Dimary S Lopez Cruz
*Assistant Examiner* — Marin Stoytchev Stoytchev
(74) *Attorney, Agent, or Firm* — McClure, Qualey & Rodack, LLP

(57) ABSTRACT

An antenna system, an antenna device, and an antenna structure are provided. The antenna structure includes a ring-shaped segment, a bandwidth adjustment segment, and a frequency adjustment segment. The ring-shaped segment has a first end portion, a second end portion spaced apart from the first end portion, and a surrounding portion connected between the first end portion and the second end portion. The bandwidth adjustment segment is connected to the first end portion and a part of the surrounding portion adjacent to the first end portion and has a first length along a first direction. The frequency adjustment segment is connected to the bandwidth adjustment segment and has a second length along the first direction and greater than the first length. The antenna structure is configured to generate a three-dimensional sensing space for obtaining signals from at least one sensor located in the three-dimensional sensing space.

20 Claims, 15 Drawing Sheets

(56) References Cited

U.S. PATENT DOCUMENTS

2015/0207230 A1* 7/2015 Oh ........................... H01Q 7/00
343/702
2020/0083603 A1* 3/2020 Wu .......................... H01Q 7/00

* cited by examiner

ANTENNA SYSTEM, ANTENNA DEVICE, AND ANTENNA STRUCTURE

CROSS-REFERENCE TO RELATED PATENT APPLICATION

This application claims the benefit of priority to Taiwan Patent Application No. 112133962, filed on Sep. 7, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna, and more particularly to an antenna system, an antenna device, and an antenna structure.

BACKGROUND OF THE DISCLOSURE

Since there is no specific restriction on or specific design for the operational range of existing wireless reading devices, the existing wireless reading devices often encounter interference from nearby frequency bands during operation. In view of the above, a reasonable design has been proposed to effectively improve the aforementioned defects.

SUMMARY OF THE DISCLOSURE

The embodiments of the present disclosure aim to provide an antenna system, an antenna device, and an antenna structure that effectively improve the potential defects associated with existing wireless reading devices.

In one aspect, the present disclosure provides an antenna device that includes an antenna structure and a communication element. The antenna structure includes a ring-shaped segment, a bandwidth adjustment segment, and a frequency adjustment segment. The ring-shaped segment includes a first end portion, a second end portion spaced apart from the first end portion, and a surrounding portion connected between the first end portion and the second end portions. A gap is formed between the first end portion and the second end portion, and the first end portion, the second end portion, and the surrounding portion jointly define a layout region that is in spatial communication with the gap. The bandwidth adjustment segment is located within the layout region and connected to the first end portion and a part of the surrounding portion adjacent to the first end portion. The bandwidth adjustment segment has a first length along a first direction. The frequency adjustment segment is located within the layout region and connected to the bandwidth adjustment segment. The frequency adjustment segment has a second length along the first direction, and the second length is greater than the first length. The communication element is electrically connected to the first end portion and the second end portion of the ring-shaped segment of the antenna structure. A three-dimensional sensing space is established by the antenna structure through the communication element, so as to enable the antenna structure to obtain signals from at least one sensor located within the three-dimensional sensing space.

In another aspect, the present disclosure provides an antenna structure that includes a ring-shaped segment, a bandwidth adjustment segment, and a frequency adjustment segment. The ring-shaped segment has a first end portion, a second end portion spaced apart from the first end portion, and a surrounding portion connected between the first end portion and the second end portion. A gap is formed between the first end portion and the second end portion, and the first end portion, the second end portion, and the surrounding portion jointly define a layout region that is in spatial communication with the gap. The bandwidth adjustment segment is located within the layout region and connected to the first end portion and a part of the surrounding portion adjacent to the first end portion. The bandwidth adjustment segment has a first length along a first direction. The frequency adjustment segment is located within the layout region and connected to the bandwidth adjustment segment. The frequency adjustment segment has a second length along the first direction, and the second length is greater than the first length. A three-dimensional sensing space is established by the antenna structure through a communication element, so as to enable the antenna structure to obtain signals from at least one sensor located within the three-dimensional sensing space.

In yet another aspect, the present disclosure provides an antenna system that includes an antenna device and a plurality of sensors. The antenna device includes an antenna structure and a communication element. The antenna structure includes a ring-shaped segment, a bandwidth adjustment segment, and a frequency adjustment segment. The ring-shaped segment has a first end portion, a second end portion spaced apart from the first end portion, and a surrounding portion connected between the first end portion and the second end portion. A gap is formed between the first end portion and the second end portion, and the first end portion, the second end portion, and the surrounding portion jointly define a layout region that is in spatial communication with the gap. The bandwidth adjustment segment is located within the layout region and connected to the first end portion and a part of the surrounding portion adjacent to the first end portion. The bandwidth adjustment segment has a first length along a first direction. The frequency adjustment segment is located within the layout region and connected to the bandwidth adjustment segment. The frequency adjustment segment has a second length along the first direction, and the second length is greater than the first length. The communication element is electrically connected to the first end portion and the second end portion of the ring-shaped segment of the antenna structure. A three-dimensional sensing space is established by the antenna structure through the communication element. The plurality of sensors are respectively placed in a plurality of independent chambers located within the three-dimensional sensing space, so that the antenna device is able to obtain signals from the plurality of sensors.

In summary, the antenna system, antenna device, and antenna structure disclosed in the embodiments of the present disclosure generate the three-dimensional sensing space of a predefined range by using the antenna structure in cooperation with the communication element, facilitating the accurate acquisition of signals from at least one sensor located within the three-dimensional sensing space and effectively avoiding external interference.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
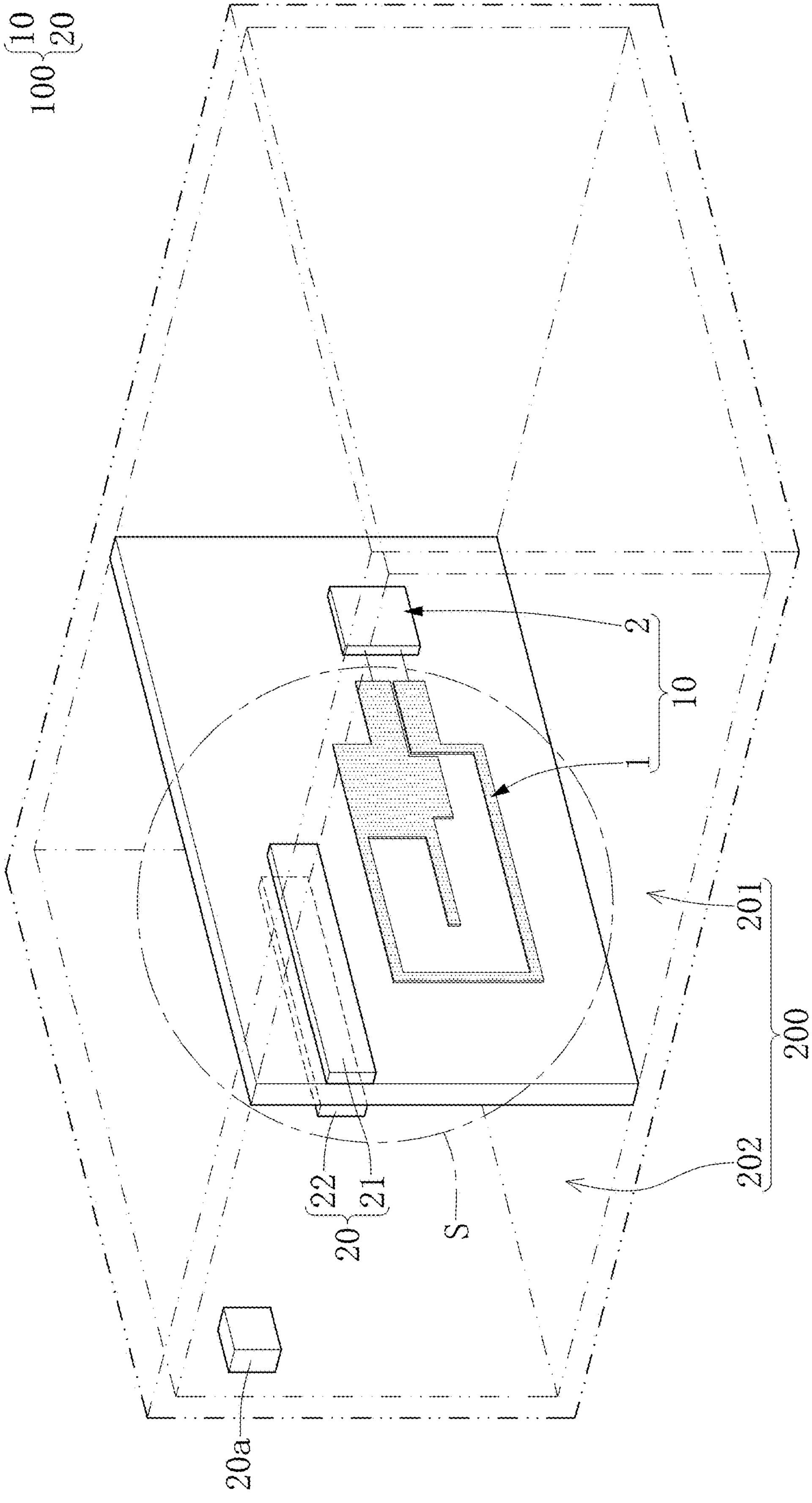
FIG. 1 is a schematic perspective view of an antenna system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "or", as used herein, should include any one or a combination of the associated enlisted items, as the case may be. The term "connect" in the context of the present disclosure means there is a physical connection between two elements and is directly or indirectly connected. The term "couple" in the context of the present disclosure means there is no physical connection between two separated elements, and the two elements are instead connected by their electric field energy where the electric field energy generated by the current of one element excites the electric field energy of the other element.

First Embodiment

Figure 2:
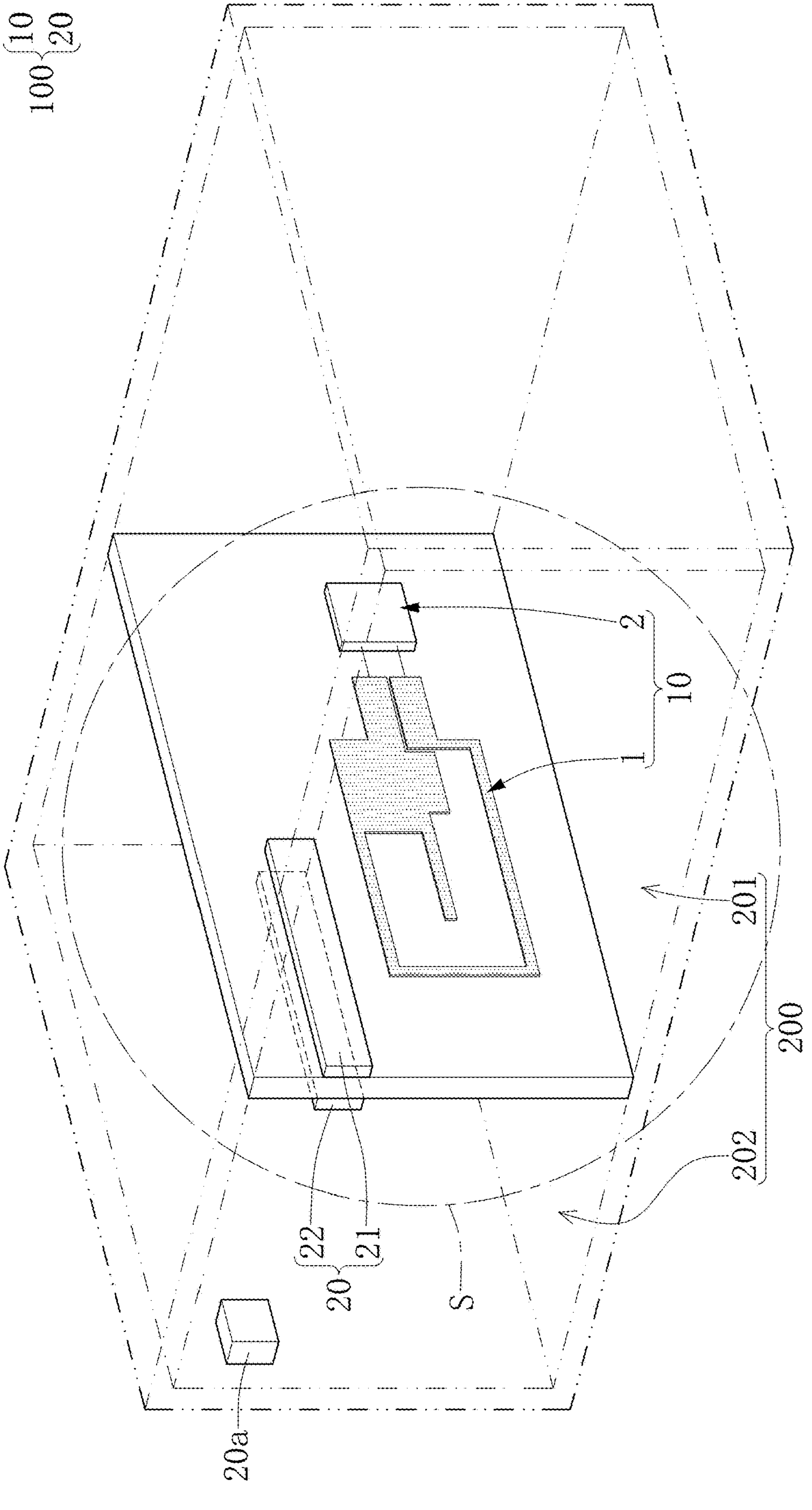
FIG. 2 is a schematic perspective view showing the antenna system in FIG. 1 after adjusting its three-dimensional sensing space.

Referring to FIG. 1 to FIG. 12, which show a first embodiment of the present disclosure. As shown in FIG. 1 and FIG. 2, an antenna system 100 is applicable to an environment with multiple independent chambers 200. That is, the chambers 200 are separated from each other and are preferably not spatially connected to each other, and the chambers 200 can be separated from each other through radiation-penetrable materials (such as non-metallic low-dielectric-loss materials) as needed. The antenna system 100 includes an antenna device 10 and a plurality of sensors 20 that are in cooperation with the antenna device 10.

Furthermore, the plurality of sensors 20 are respectively placed in the plurality of chambers 200 and are located within a three-dimensional sensing space S established by the antenna device 10, so that the antenna device 10 can obtain signals from the plurality of sensors 20. However, the antenna device 10 preferably does not or cannot obtain signals from any external sensor 20*a* located outside of the three-dimensional sensing space S. For ease of understanding this embodiment, as shown in FIG. 1 and FIG. 2, the plurality of chambers 200 are shown as a first chamber 201 and a second chamber 202, and the plurality of sensors 20 include a first sensor 21 located in the first chamber 201 and a second sensor 22 located in the second chamber 202.

It should be noted that although the antenna device 10 in this embodiment is described as being cooperated with the plurality of sensors 20, the present disclosure is not limited thereto. For example, in other embodiments of the present disclosure not shown in the drawings, the antenna device 10 can be used alone (e.g., sold) or can be cooperated with other components (e.g., the antenna device 10 can be cooperated with at least one sensor 20 located in a same one of the chamber 200); or, a quantity of the sensors 20 and a quantity of the chambers 200 can be adjusted according to design requirements (e.g., the quantity of the sensors 20 can be three or more, and the quantity of the chambers 200 can also be three or more).

The antenna device 10 includes an antenna structure 1 and a communication element 2 electrically connected to the antenna structure 1, so that the antenna structure 1 can establish the three-dimensional sensing space S through the communication element 2, thereby obtaining signals from at least one sensor 20 located within the three-dimensional sensing space S.

Furthermore, the three-dimensional sensing space S is generally spherical, and its radius can be changed by adjusting the transmission power of the communication element 2 according to actual needs. For example, the range of the three-dimensional sensing space S is changeable by adjusting the operation of the communication element 2 between a first transmission power and a second transmission power that is greater than the first transmission power. Specifically, the communication element 2 operating at the first transmission power can generate a smaller three-dimensional sensing space S (e.g., FIG. 1), and the communication element 2 operating at the second transmission power can generate a larger three-dimensional sensing space S (e.g., FIG. 2).

Additionally, the specific implementation type of the communication element 2 can be adjusted according to different design requirements. In this embodiment, the communication element 2 is a Radio Frequency Identification (RFID) reader or a Global System for Mobile Communications (GSM) receiver, but the present disclosure is not limited thereto.

It should also be noted that although the antenna structure 1 in this embodiment is described as being cooperated with the communication element 2, the present disclosure is not limited thereto. For example, in other embodiments of the present disclosure not shown in the drawings, the antenna structure 1 can be used alone (e.g., sold) or can be cooperated with other components. The specific structure of the antenna structure 1 will be described below, and the connection relationship between the antenna structure 1 and other components will be explained.

Figure 3:
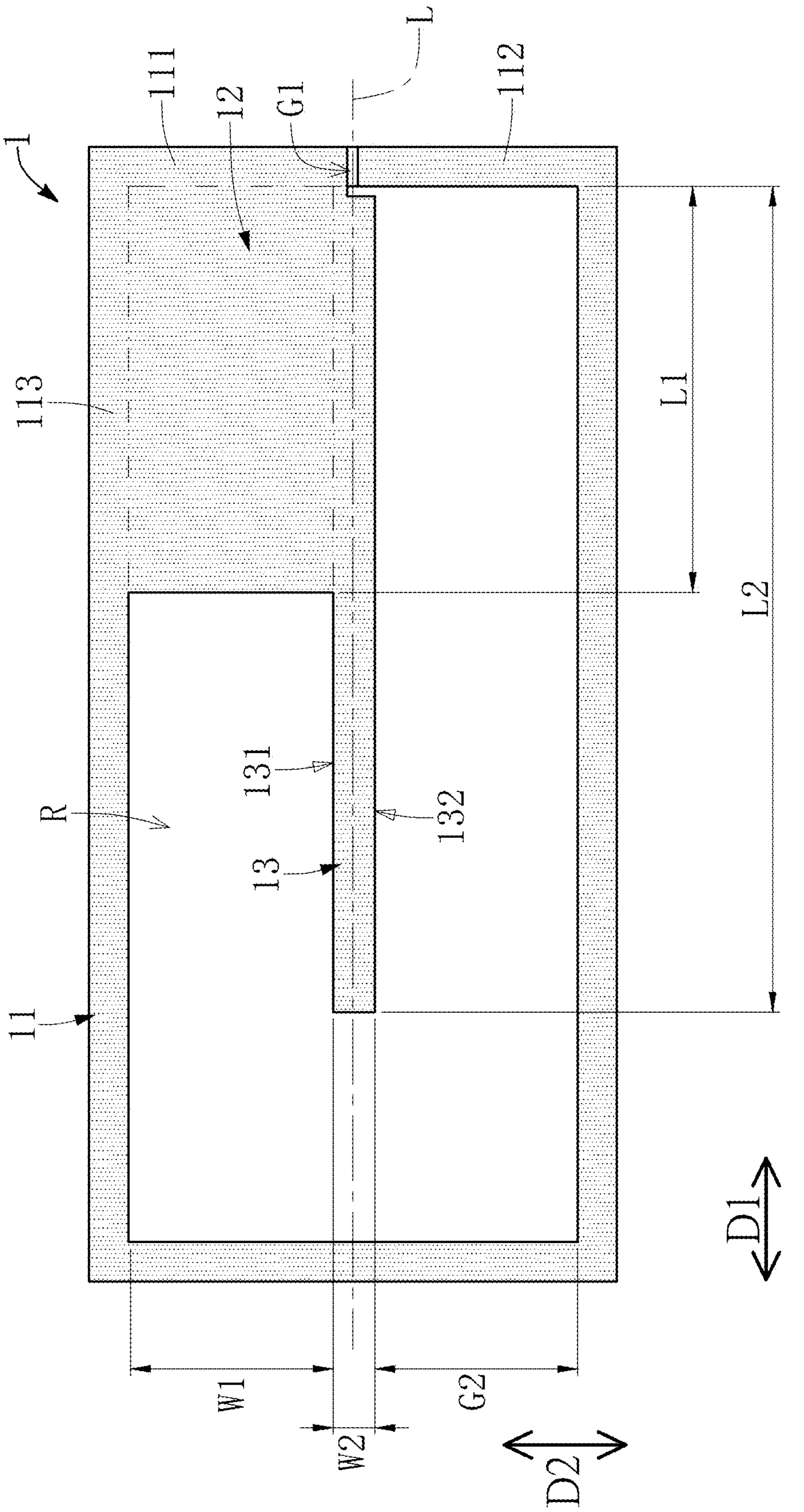
FIG. 3 is a schematic planar view of an antenna structure in FIG. 1.

As shown in FIG. 2 and FIG. 3, the antenna structure 1 in this embodiment includes a ring-shaped segment 11, a bandwidth adjustment segment 12, and a frequency adjustment segment 13, and the three segments are integrally connected to each other. The bandwidth adjustment segment 12 and the frequency adjustment segment 13 are arranged within a region surrounded by the ring-shaped segment 11. The antenna structure 1 is configured to operate at a center frequency, and the circumference of the ring-shaped segment 11 is within a range from 70% to 100% of the wavelength corresponding to the center frequency.

Specifically, the ring-shaped segment 11 has a first end portion 111, a second end portion 112 spaced apart from the first end portion 111, and a surrounding portion 113 connected between the first end portion 111 and the second end portion 112. In this embodiment, a gap G1 is formed between the first end portion 111 and the second end portion 112, the ring-shaped segment 11 defines a reference axis L parallel to a first direction D1 and passing through the gap G1, and the ring-shaped segment 11 is preferably mirror-symmetrical to the reference axis L, but the present disclosure is not limited thereto.

The first end portion 111 and the second end portion 112 are each a strip-shaped structure perpendicular to the first direction D1, the first end portion 111 and the second end portion 112 are arranged in a straight line along a second direction D2 perpendicular to the first direction D1, and the communication element 2 is electrically connected to the first end portion 111 and the second end portion 112. Furthermore, the distance between the first end portion 111 and the second end portion 112 (i.e., the width of the gap G1) is less than or equal to 1% of the circumference of the ring-shaped segment 11.

The surrounding portion 113 is generally U-shaped, with its two ends respectively connected perpendicularly to the first end portion 111 and the second end portion 112, so that the first end portion 111, the second end portion 112, and the surrounding portion 113 jointly define (e.g., collectively enclose or surround) a layout region R that is in spatial communication with the gap G1. That is, the layout region R (or the ring-shaped segment 11) in FIG. 3 of this embodiment is generally rectangular.

The bandwidth adjustment segment 12 and the frequency adjustment segment 13 are located within the layout region R and generally occupy 20% to 55% of the area of the layout region R, but are not limited thereto. The bandwidth adjustment segment 12 is connected to the first end portion 111 and a part of the surrounding portion 113 adjacent to the first end portion 111 (e.g., the right upper part of the surrounding portion 113 shown in FIG. 3), without touching the second end portion 112. Furthermore, at least 90% of an area of the bandwidth adjustment segment 12 is located at one side of the reference axis L.

In this embodiment, the bandwidth adjustment segment 12 is generally rectangular and completely located at the upper side of the reference axis L as shown in FIG. 3. The bottom edge of the bandwidth adjustment segment 12 along the first direction D1 is approximately flush with the end edge of the first end portion 111. The bandwidth adjustment segment 12 has a first length L1 along the first direction D1 and a first width W1 along the second direction D2. In this embodiment, the first length L1 is less than or equal to 12.5% of the circumference (or 12.5% of the wavelength corresponding to the center frequency), and the first width W1 is less than the first length L1 and is approximately equal to the length of the first end portion 111.

Figure 4:
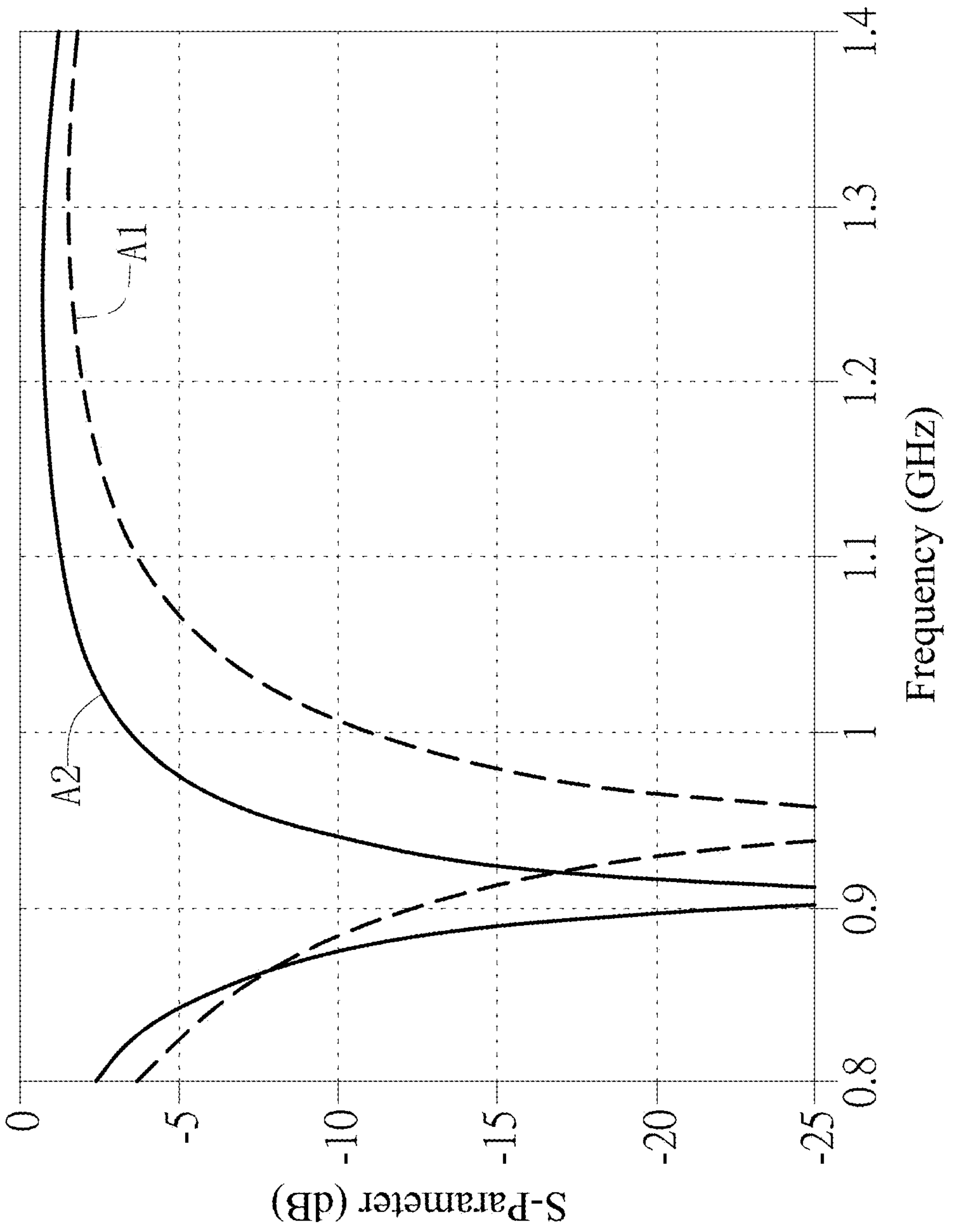
FIG. 4 is a graph illustrating simulation test results of the antenna structure in FIG. 3 (Part 1)

Furthermore, as shown in FIG. 4, the curve A1 represents the simulation test results of the antenna structure 1 with only the ring-shaped segment 11 and the bandwidth adjustment segment 12, while the curve A2 represents the simulation test results of the antenna structure 1 with only the ring-shaped segment 11. From this, it is clear that the antenna structure 1 can significantly increase the bandwidth at −10 dB by arranging the bandwidth adjustment segment 12 (e.g., the bandwidth of the curve A1 can be increased to be approximately two times of that of the curve A2).

Moreover, the frequency adjustment segment 13 is connected to the bandwidth adjustment segment 12 (at the bottom edge of the bandwidth adjustment segment 12) and arranged along the second direction D2, with a configuration distance G2 separating it from another part of the surrounding portion 113 adjacent to the second end portion 112 (e.g., the right lower part of the surrounding portion 113 in FIG. 3), without touching the second end portion 112.

Furthermore, the frequency adjustment segment 13 is a strip-shaped structure parallel to the first direction D1, and in this embodiment, the frequency adjustment segment 13 is arranged along the reference axis L, so that one end of the frequency adjustment segment 13 is adjacent to the gap G1, but the present disclosure is not limited thereto. The frequency adjustment segment 13 has a first long side 131 on one side thereof and a second long side 132 on an opposite side thereof, and the bandwidth adjustment segment 12 is connected to the first long side 131 of the frequency adjustment segment 13. In other words, the bandwidth adjustment segment 12 is connected between the frequency adjustment segment 13 and the surrounding portion 113 along the second direction D2.

Specifically, the frequency adjustment segment 13 has a second length L2 along the first direction D1 and a second width W2 along the second direction D2. In this embodiment, the second length L2 is greater than the first length L1 but less than or equal to 25% of the circumference (or 25% of the wavelength corresponding to the center frequency), and the second width W2 is greater than the width of the gap G1 but less than the first width W1.

Figure 5:
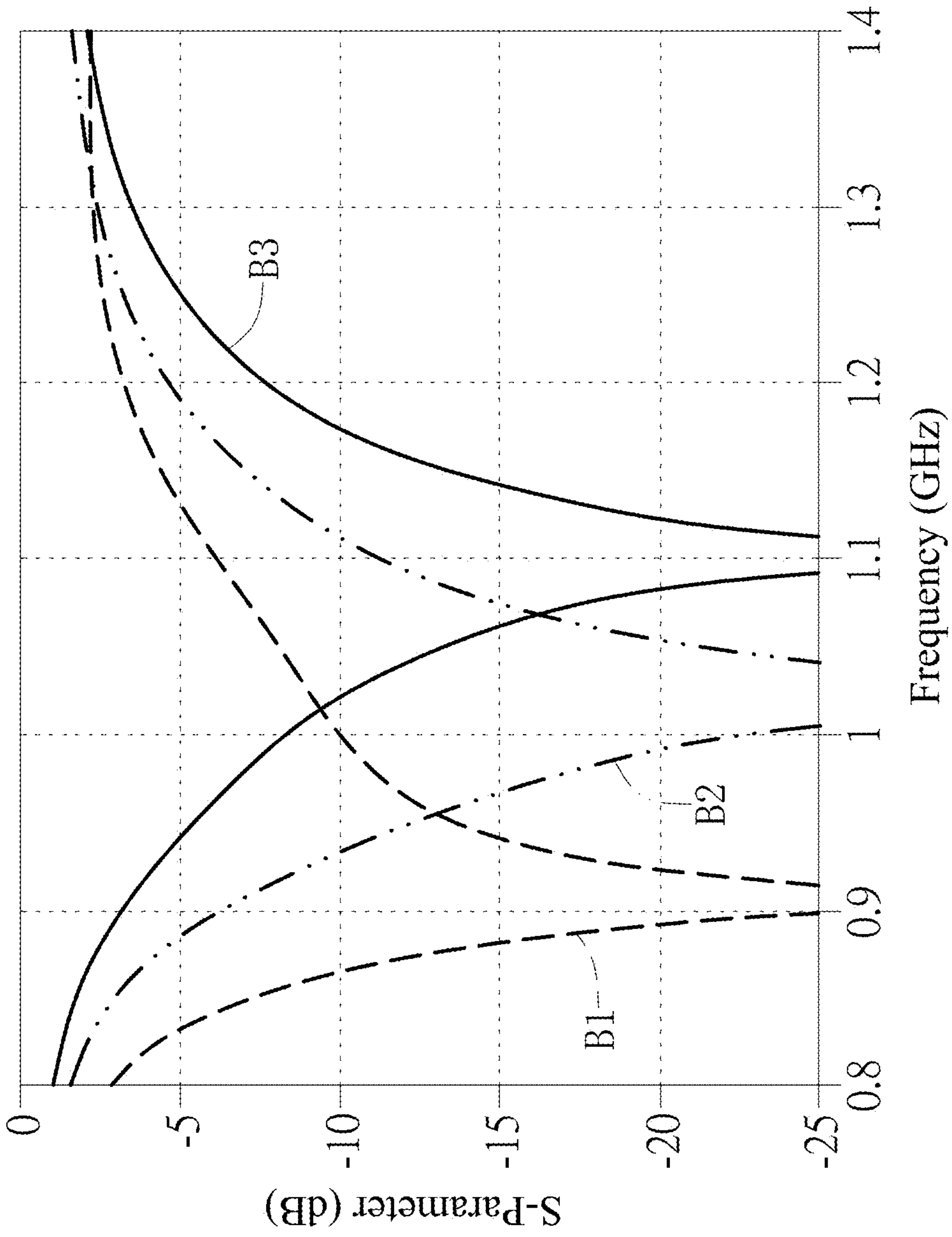
FIG. 5 is a graph illustrating simulation test results of the antenna structure in FIG. 3 (Part 2)

Furthermore, as shown in FIG. 5, the curves B1, B2, and B3 represent the simulation test results of the antenna structure 1 with the ring-shaped segment 11, the bandwidth adjustment segment 12, and the frequency adjustment segment 13, with the first length L1 arranged in descending order. From this, it is clear that the antenna structure 1 can change the corresponding center frequency by adjusting the first length L1 of the bandwidth adjustment segment 12.

Figure 6:
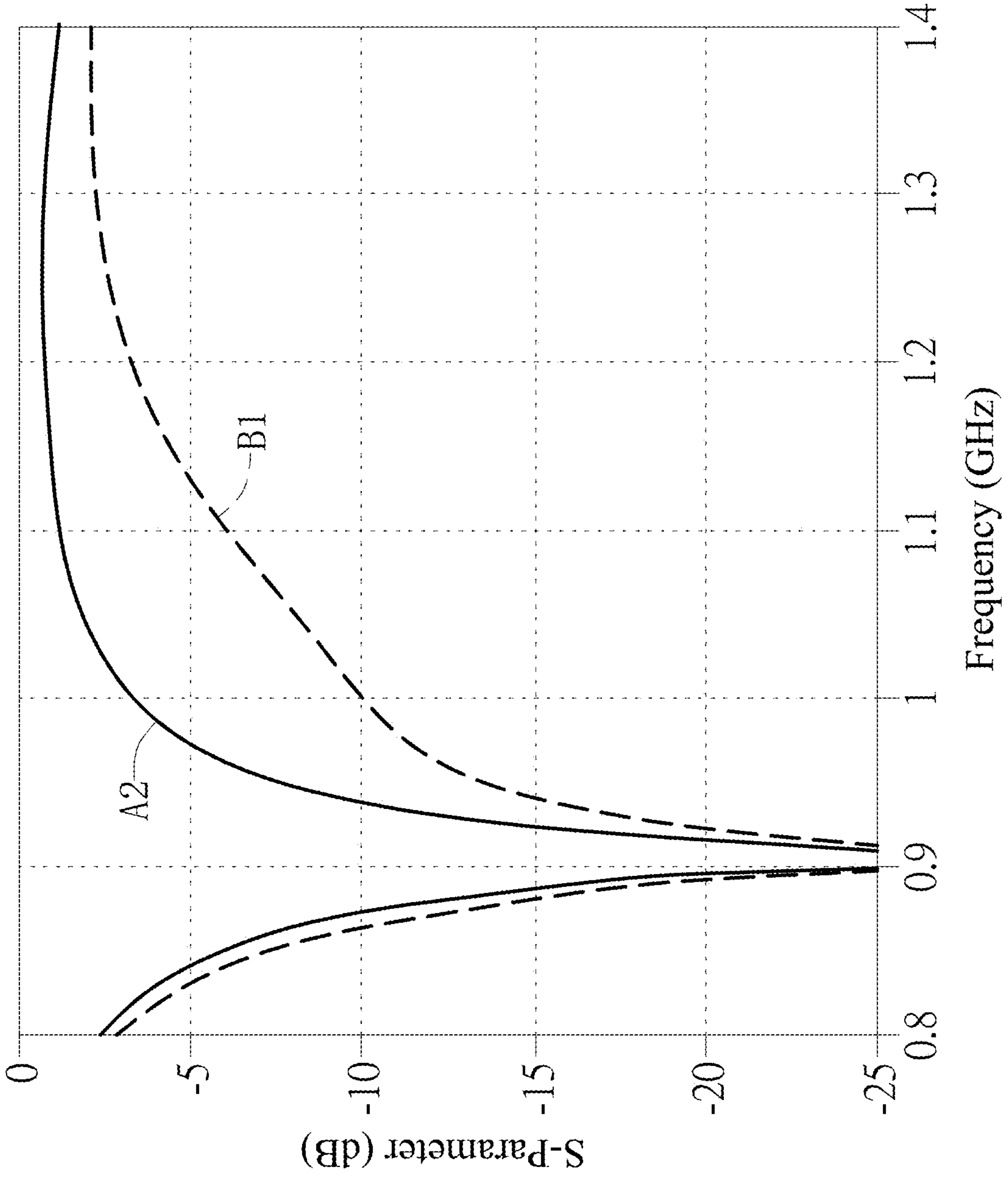
FIG. 6 is a graph illustrating simulation test results of the antenna structure in FIG. 3 (Part 3)

Moreover, as shown in FIG. 6, which is a comparative diagram of curve A2 and curve B1, it can be seen that the antenna structure 1 in this embodiment achieves a larger bandwidth (e.g., approximately doubled) under a preset center frequency by arranging the bandwidth adjustment segment 12 and the frequency adjustment segment 13 with specific conditions (e.g., the second length L2 being greater than the first length L1) at specific positions within the layout region R of the ring-shaped segment 11.

Figure 7:
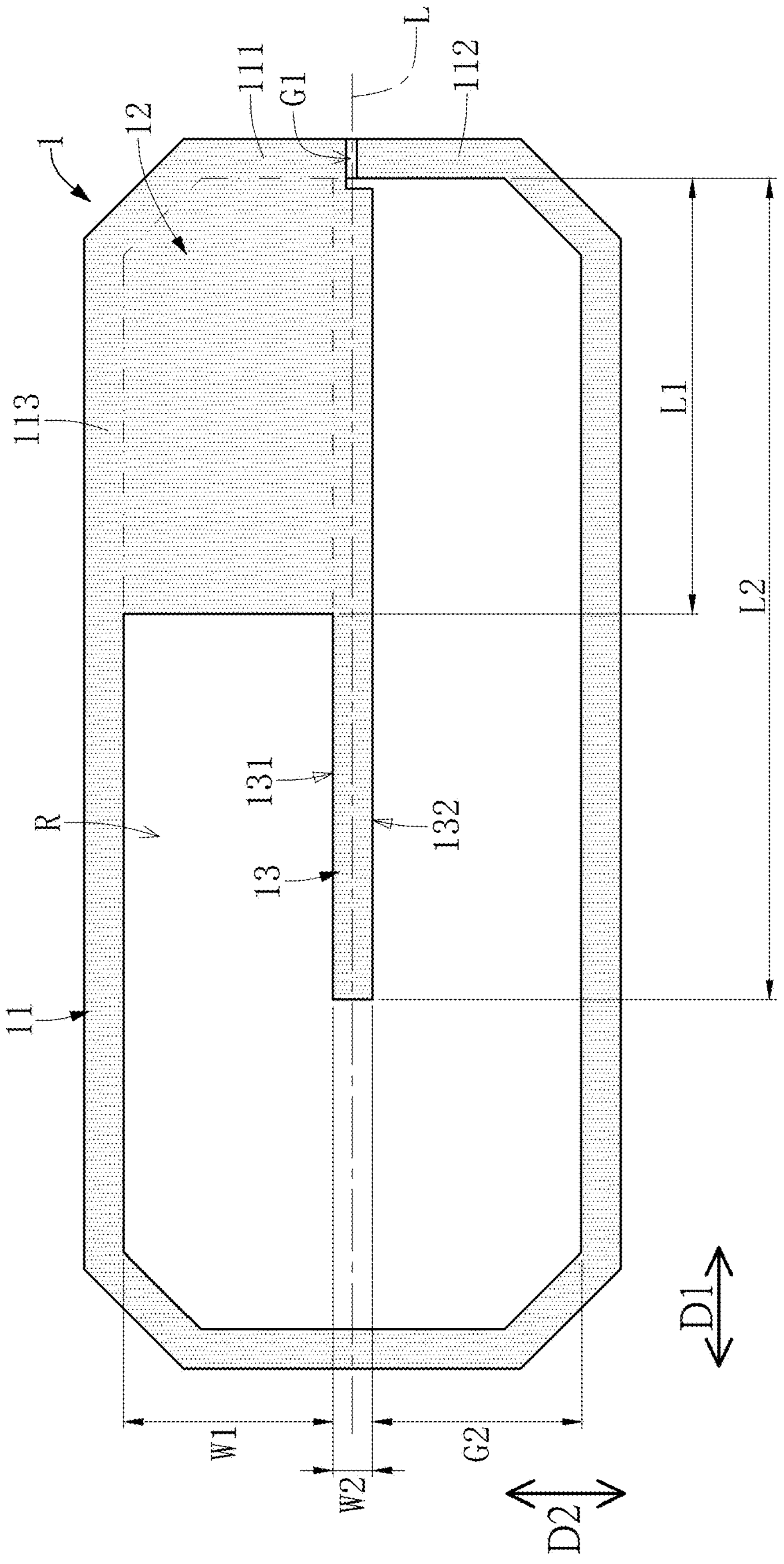
FIG. 7 is a planar view of the antenna structure having a polygonal contour according to the first embodiment of the present disclosure.
Figure 8:
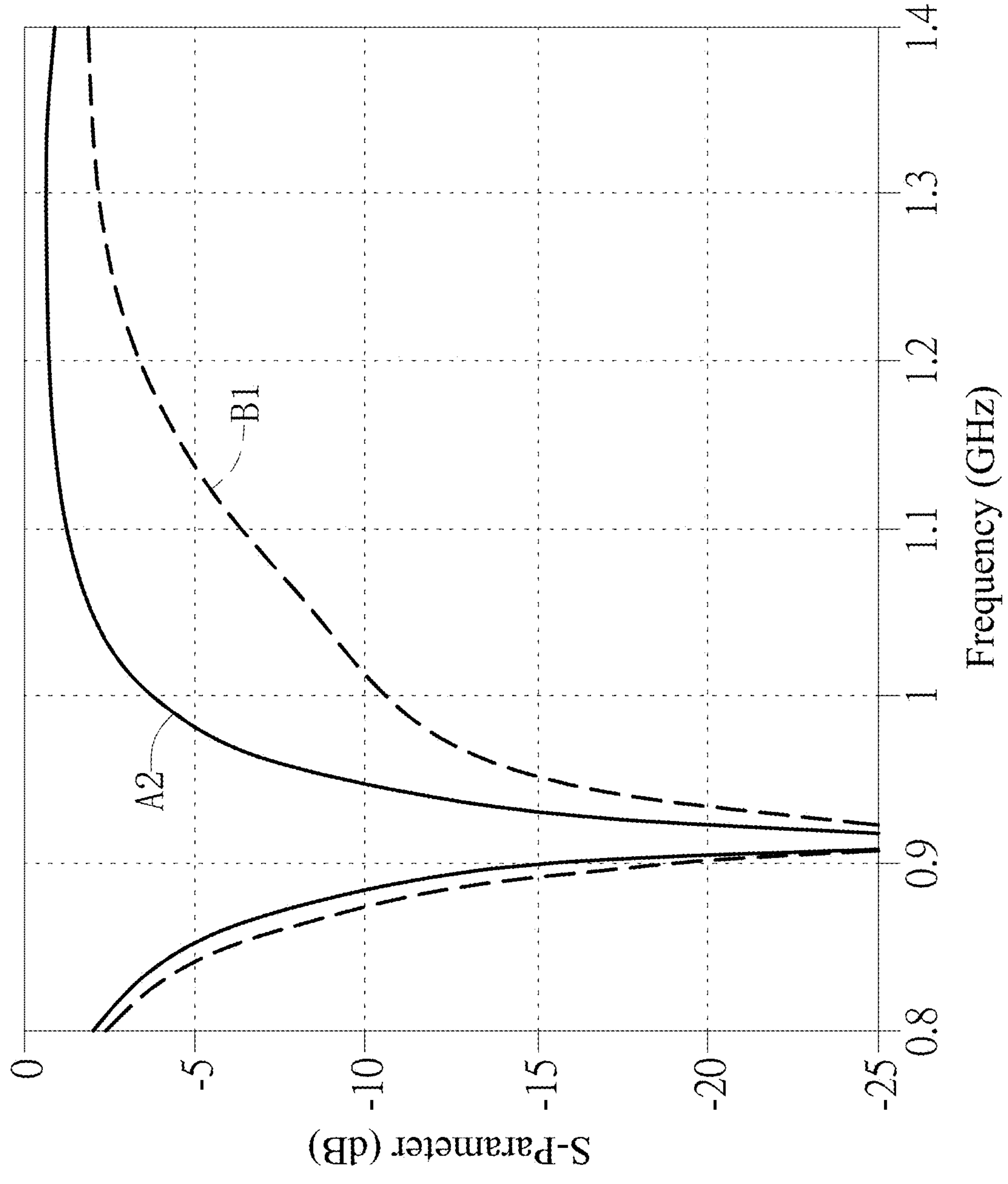
FIG. 8 is a graph illustrating simulation test results of the antenna structure in FIG. 7.
Figure 9:
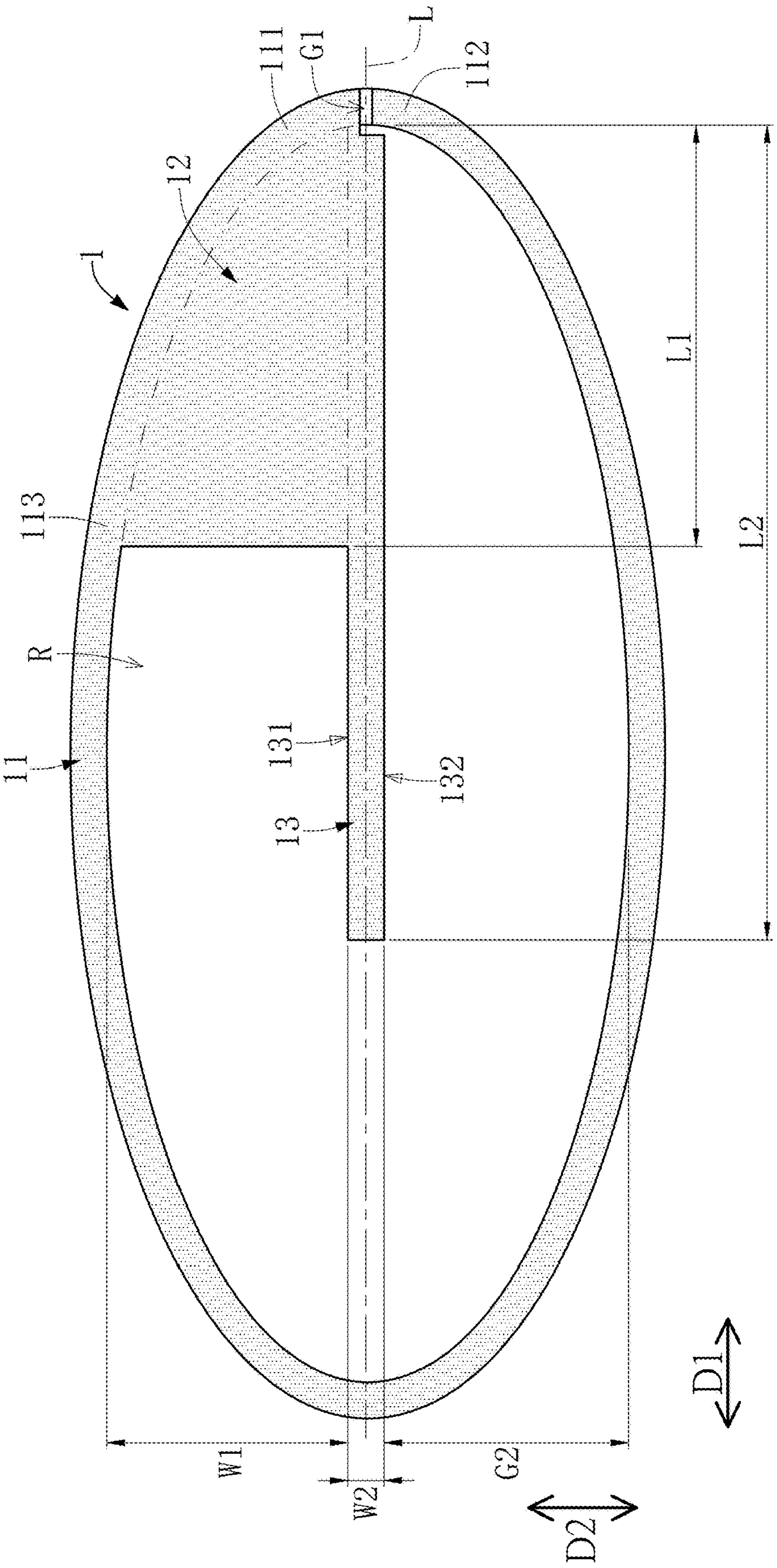
FIG. 9 is a schematic planar view of the antenna structure having an elliptical contour according to the first embodiment of the present disclosure.
Figure 10:
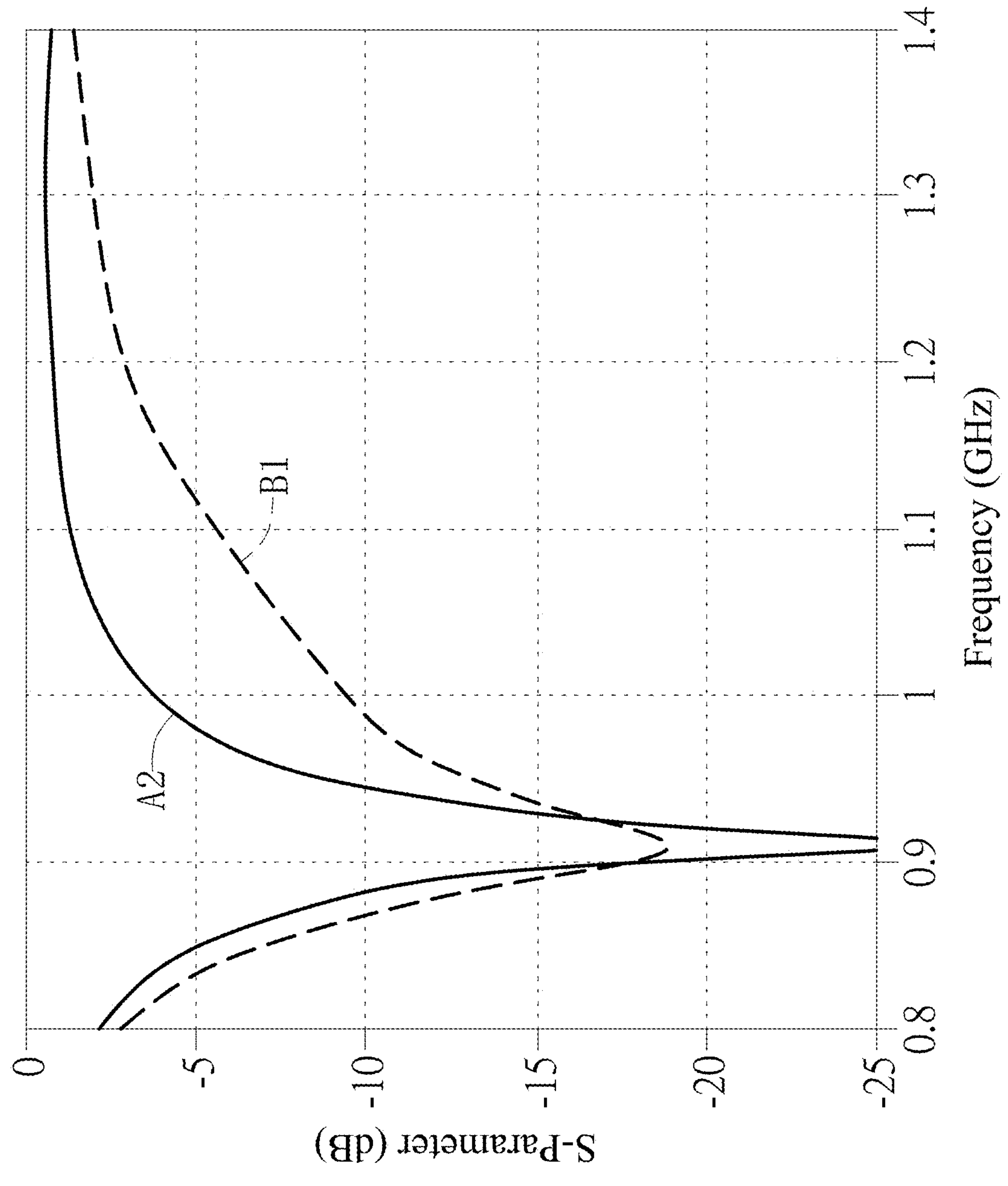
FIG. 10 is a graph illustrating simulation test results of the antenna structure in FIG. 9.
Figure 11:
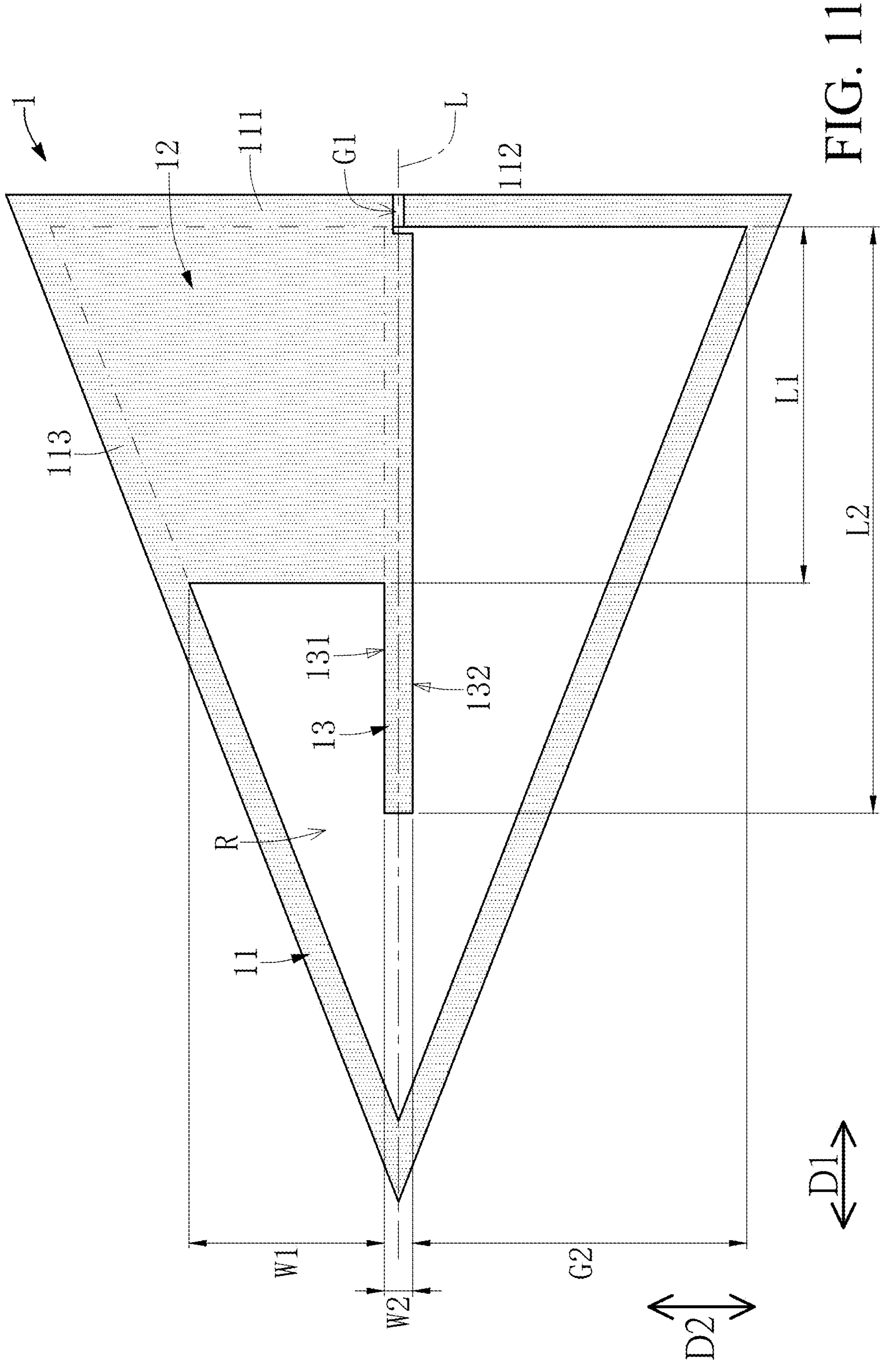
FIG. 11 is a schematic planar view of the antenna structure having a triangular contour according to the first embodiment of the present disclosure.
Figure 12:
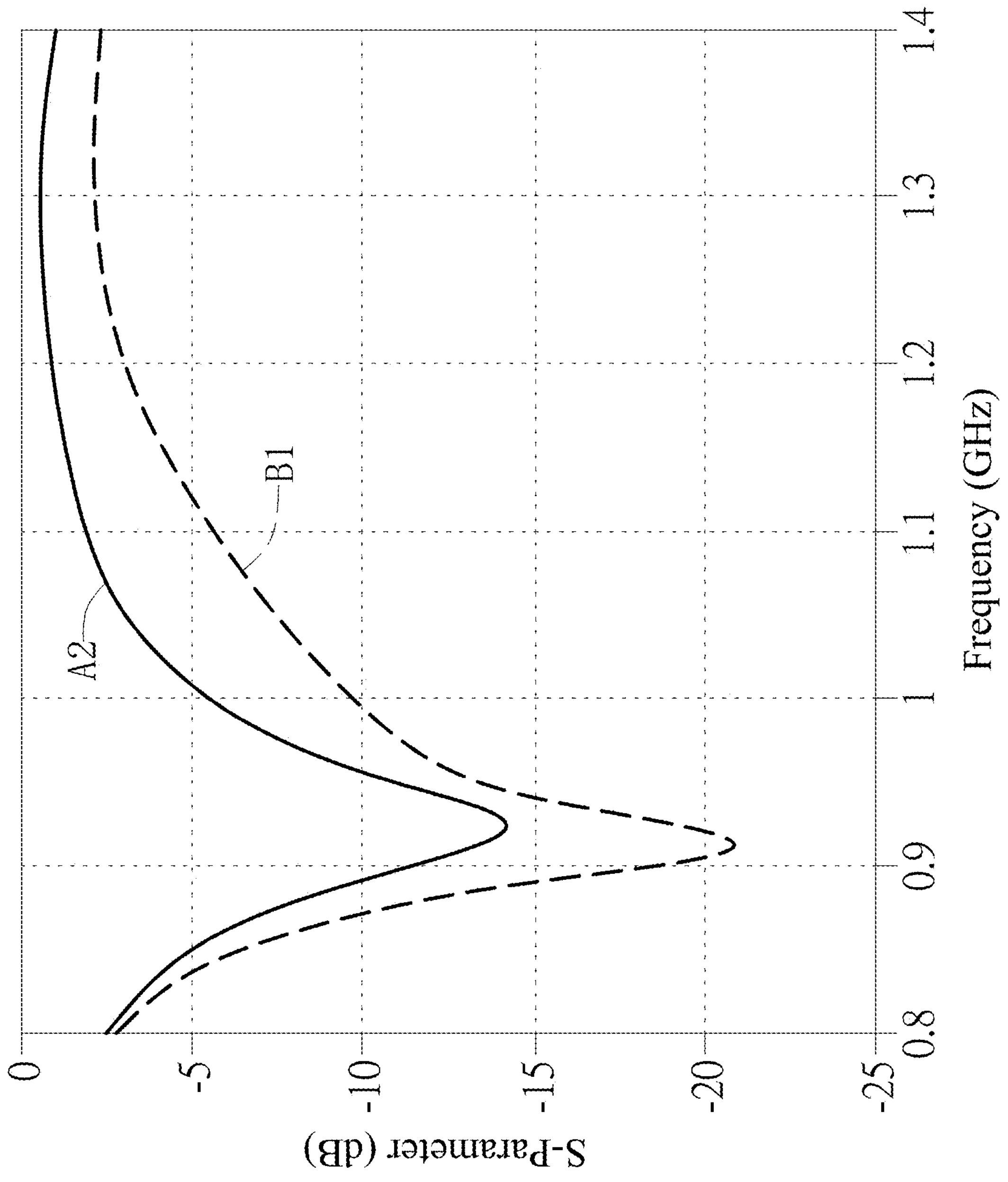
FIG. 12 is a graph illustrating simulation test results of the antenna structure in FIG. 11.

Furthermore, the shape of the ring-shaped segment 11 is described as a rectangular shape shown in FIG. 3, but the shapes of the ring-shaped segment 11 and the bandwidth adjustment segment 12 can be adjusted or changed according to design requirements. The present disclosure is not limited to the structure shown in FIG. 3. For example, as shown in FIG. 7 and FIG. 8, the ring-shaped segment 11 can be a polygonal structure; or, as shown in FIG. 9 and FIG. 10, the ring-shaped segment 11 can be an elliptical structure; or, as shown in FIG. 11 and FIG. 12, the ring-shaped segment 11 can be a triangular structure. Furthermore, after simulation tests, it is found that the antenna structure 1 can still maintain a larger bandwidth (e.g., approximately doubled) under the preset center frequency with the ring-shaped segment 11 being the abovementioned structures.

In summary, the antenna system 100 (or the antenna device 10) in this embodiment can generate the three-dimensional sensing space S of a predefined range through the cooperation between the antenna structure 1 and the communication element 2, facilitating the accurate acquisition of signals from at least one of the sensors 20 located within the three-dimensional sensing space S and effectively avoiding external interference.

Second Embodiment

Figure 13:
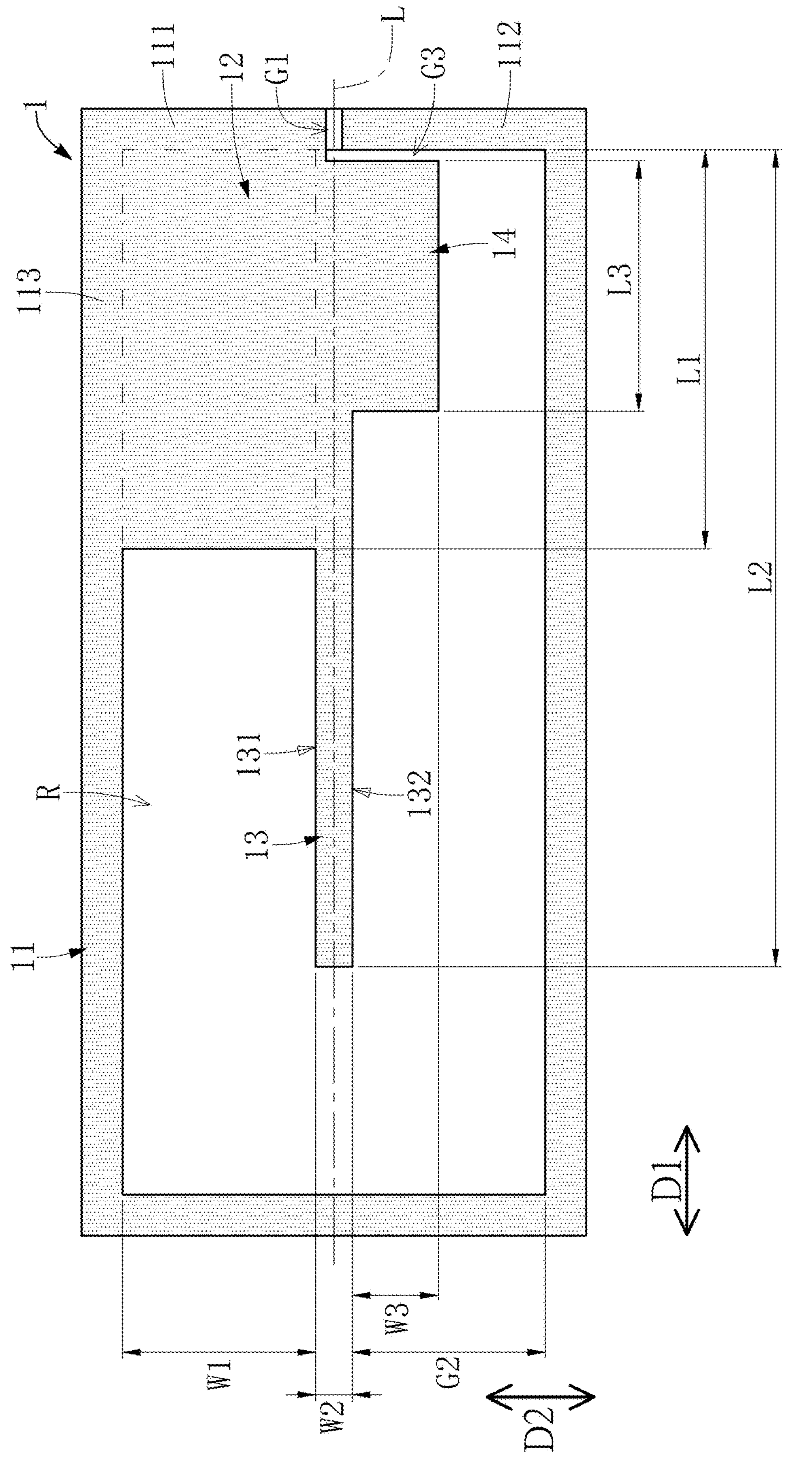
FIG. 13 is a schematic planar view of an antenna structure according to a second embodiment of the present disclosure.
Figure 14:
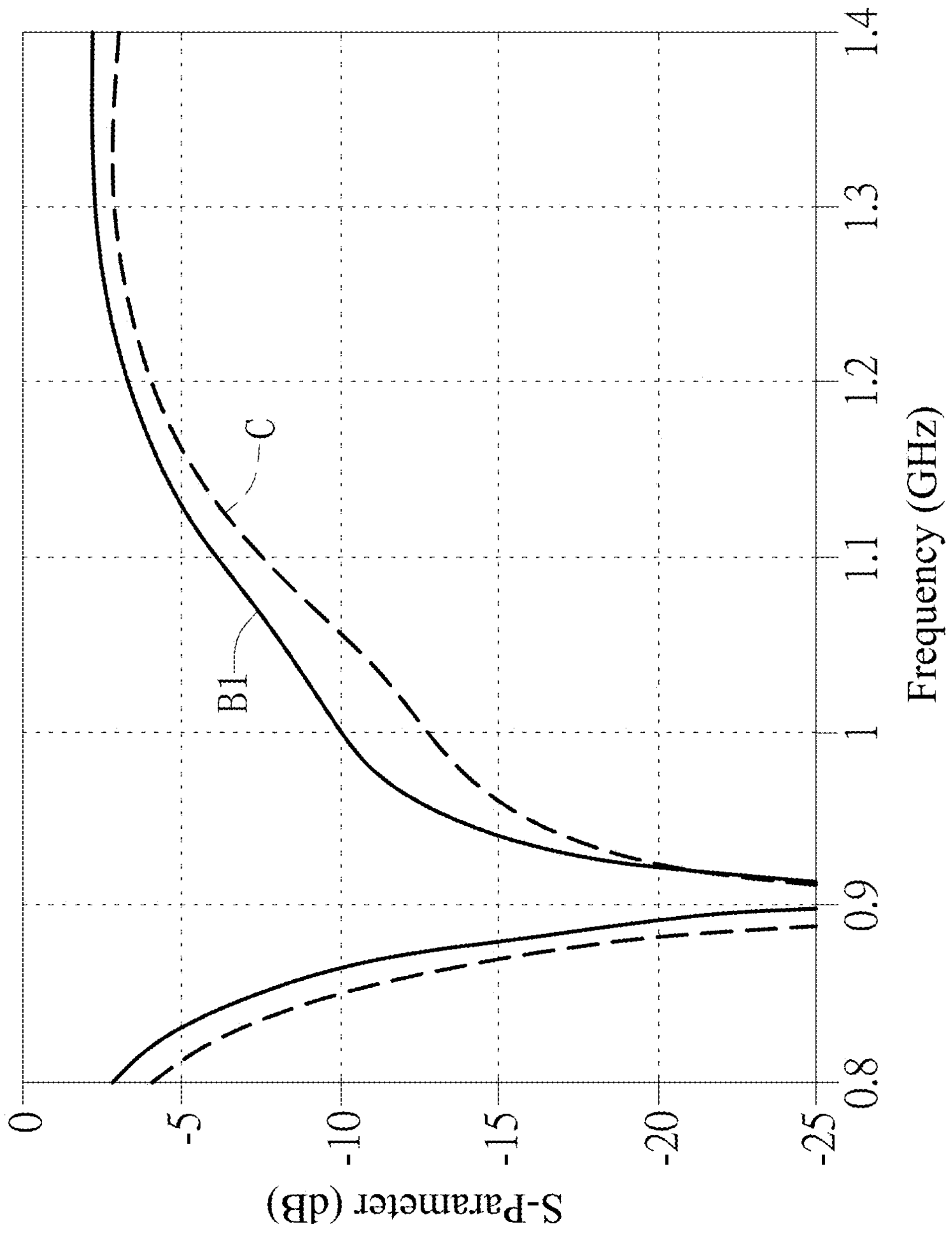
FIG. 14 is a graph illustrating simulation test results of the antenna structure in FIG. 13.
Figure 15:
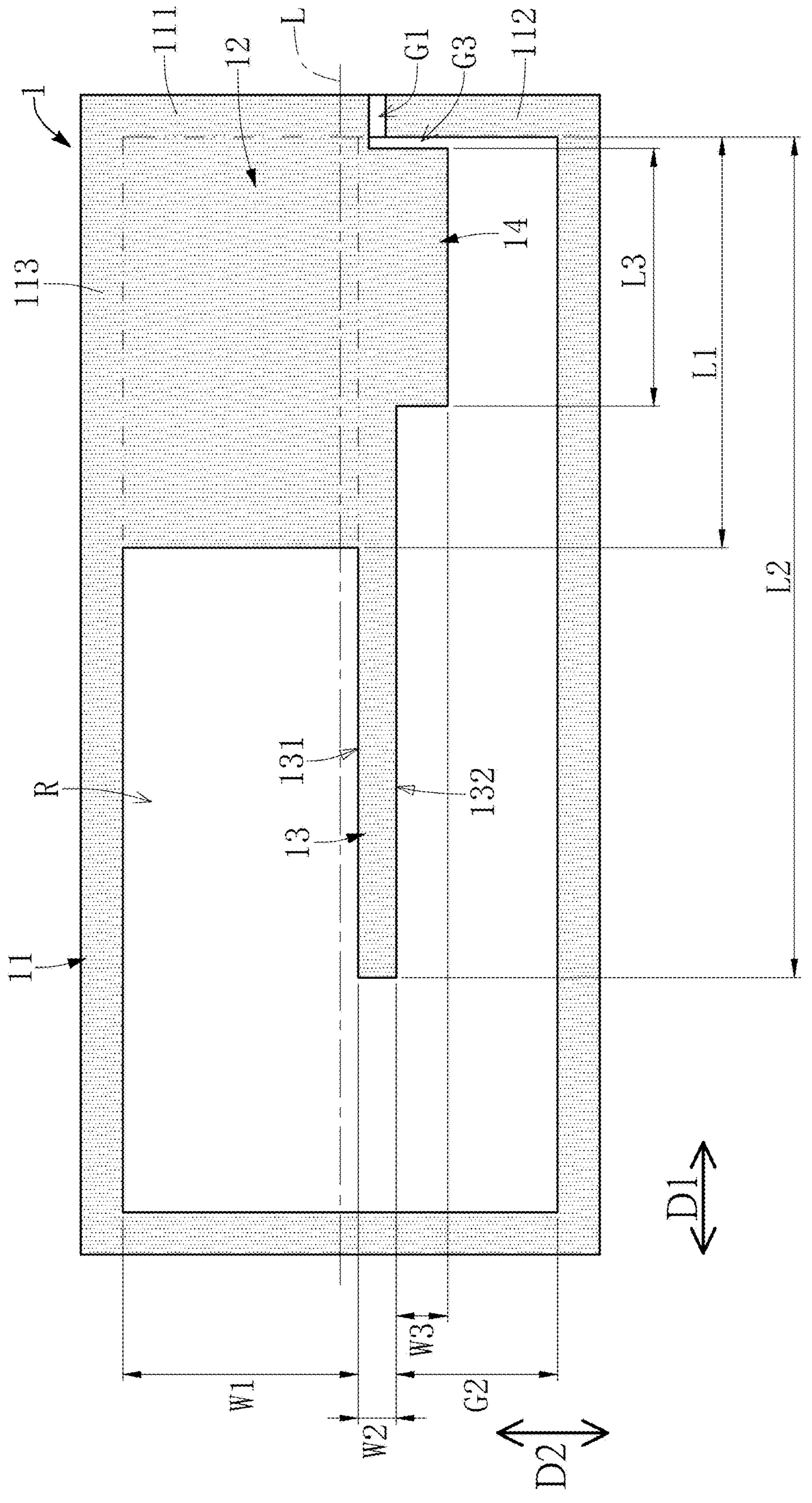
FIG. 15 is a schematic planar view of a variant of the antenna structure according to the second embodiment of the present disclosure.

Referring to FIG. 13 to FIG. 15, which show the second embodiment of the present disclosure. Since this embodiment is similar to the first embodiment, the similarities will not be described herein, and the differences will be described as follows.

In this embodiment, as shown in FIG. 13, the antenna structure 1 includes an auxiliary adjustment segment 14 located within the layout region R and connected to the frequency adjustment segment 13 (at the second long side 132 of the frequency adjustment segment 13). In other words, the bandwidth adjustment segment 12 and the auxiliary adjustment segment 14 are connected to two opposite sides of the frequency adjustment segment 13. One end of the auxiliary adjustment segment 14 faces the second end portion 112 along the first direction D1, and the one end of the auxiliary adjustment segment 14 is flush with the end of the frequency adjustment segment 13. As such, a slit G3 being in spatial communication with the gap G1 is formed between the auxiliary adjustment segment 14 and the second end portion 112.

Specifically, the auxiliary adjustment segment 14 has a third length L3 along the first direction D1 and a width W3 along the second direction D2. The third length L3 is less than the first length L1, and the width W3 of the auxiliary adjustment segment 14 is less than the configuration distance G2. In other words, the auxiliary adjustment segment 14 is spaced apart from the another part of the surrounding portion 113 (e.g., the right lower part of the surrounding portion 113 shown in FIG. 13) along the second direction D2.

Furthermore, as shown in FIG. 14, the curve C represents the simulation test results of the antenna structure 1 shown in FIG. 13, while the curve B1 represents the simulation test results of the antenna structure 1 shown in FIG. 3 (provided by the first embodiment). From this, it is clear that the antenna structure 1 in this embodiment can further expand its bandwidth over that of the first embodiment by arranging the auxiliary adjustment segment 14 with specific conditions at specific positions of the antenna structure 1.

Additionally, the frequency adjustment segment 13 shown in FIG. 3 and FIG. 13 is described as being arranged along the reference axis L, but the present disclosure is not limited thereto. For example, as shown in FIG. 15, at least 90% of an area of the bandwidth adjustment segment 12 is located at one side of the reference axis L, and the frequency adjustment segment 13 is located at an opposite side of the reference axis L. Alternatively, in other embodiments of the present disclosure not shown in the drawings, the bandwidth adjustment segment 12 and the frequency adjustment segment 13 can be located at the same side of the reference axis L to meet various usage requirements.

Beneficial Effects of the Embodiments

In conclusion, the antenna system, antenna device, and antenna structure disclosed in the embodiments of the present disclosure generate the three-dimensional sensing space of a predefined range by using the antenna structure in cooperation with the communication element, facilitating the accurate acquisition of signals from at least one sensor located within the three-dimensional sensing space and effectively avoiding external interference.

Furthermore, the antenna structure disclosed in the embodiments of the present disclosure achieves a larger bandwidth (e.g., approximately doubled) under a preset center frequency by arranging the bandwidth adjustment segment and the frequency adjustment segment with specific conditions (e.g., the second length being greater than the first length) at specific positions within the layout region of the ring-shaped segment.

Additionally, the antenna structure disclosed in the embodiments of the present disclosure can further increase the bandwidth by arranging an auxiliary adjustment segment with specific conditions at a specific position within the layout region of the ring-shaped segment.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna device, comprising:

an antenna structure, comprising:

a ring-shaped segment having a first end portion, a second end portion spaced apart from the first end portion, and a surrounding portion connected between the first end portion and the second end portion; wherein a gap is formed between the first end portion and the second end portion, and the first end portion, the second end portion, and the surrounding portion jointly define a layout region that is in spatial communication with the gap;

a bandwidth adjustment segment located within a corner of the layout region that is jointly defined by the first end portion and a part of the surrounding portion adjacent to the first end portion; wherein the bandwidth adjustment segment is connected to the first end portion along the first direction and the part of the surrounding portion along a second direction that is perpendicular to the first direction, and wherein the bandwidth adjustment segment has a first length along a first direction; and a frequency adjustment segment located within the layout region and connected to the bandwidth adjustment segment along the second direction; wherein the frequency adjustment segment has a second length along the first direction, and the second length is greater than the first length; and a communication element electrically connected to the first end portion and the second end portion of the ring-shaped segment of the antenna structure;

wherein a three-dimensional sensing space is established by the antenna structure through the communication element.

2. The antenna device according to claim 1, wherein the antenna structure further comprises an auxiliary adjustment segment located within the layout region and connected to the frequency adjustment segment, the auxiliary adjustment segment has a third length along the first direction, and the third length is less than the first length.

3. The antenna device according to claim 2, wherein the frequency adjustment segment is parallel to the first direction and has a strip-shaped structure; and the bandwidth adjustment segment and the auxiliary adjustment segment are respectively connected to two opposite sides of the frequency adjustment segment.

4. The antenna device according to claim 2, wherein the frequency adjustment segment is spaced apart from another part of the surrounding portion adjacent to the second end portion by a configuration distance along the second direction; a width of the auxiliary adjustment segment along the second direction is less than the configuration distance, and the auxiliary adjustment segment is spaced apart from the another part of the surrounding portion along the second direction.

5. The antenna device according to claim 4, wherein the auxiliary adjustment segment faces the second end portion along the first direction, and a slit being in spatial communication with the gap is formed between the auxiliary adjustment segment and the second end portion.

6. The antenna device according to claim 1, wherein at least 90% of an area of the bandwidth adjustment segment is located at one side of a reference axis, and the reference axis is defined to be parallel to the first direction and passing through the gap.

7. The antenna device according to claim 6, wherein the frequency adjustment segment is located at another side of the reference axis, and the ring-shaped segment is mirror-symmetrical to the reference axis.

8. The antenna device according to claim 6, wherein the frequency adjustment segment is arranged along the reference axis, and the ring-shaped segment is mirror-symmetrical to the reference axis.

9. The antenna device according to claim 1, wherein the ring-shaped segment has a circumference, the first length is less than or equal to 12.5% of the circumference, and the second length is less than or equal to 25% of the circumference.

10. The antenna device according to claim 9, wherein the antenna structure is configured to operate at a center frequency, and the circumference of the ring-shaped segment is within a range from 70% to 100% of a wavelength corresponding to the center frequency.

11. The antenna device according to claim 9, wherein a distance between the first end portion and the second end portion is less than or equal to 1% of the circumference of the ring-shaped segment.

12. The antenna device according to claim 1, wherein the bandwidth adjustment segment and the frequency adjustment segment occupy a range from 20% to 55% of an area of the layout region.

13. The antenna device according to claim 1, wherein the communication element is a Radio Frequency Identification (RFID) reader or a Global System for Mobile Communications (GSM) receiver.

14. The antenna device according to claim 13, wherein a range of the three-dimensional sensing space is changeable by adjusting an operation of the communication element between a first transmission power and a second transmission power that is greater than the first transmission power.

15. An antenna structure, comprising:

a ring-shaped segment having a first end portion, a second end portion spaced apart from the first end portion, and a surrounding portion connected between the first end portion and the second end portion; wherein a gap is formed between the first end portion and the second end portion, and the first end portion, the second end portion, and the surrounding portion jointly define a layout region that is in spatial communication with the gap;

a bandwidth adjustment segment located within a corner of the layout region that is jointly defined by the first end portion and a part of the surrounding portion adjacent to the first end portion; wherein the bandwidth adjustment segment is connected to the first end portion along the first direction and the part of the surrounding portion along a second direction that is perpendicular to the first direction, and wherein the bandwidth adjustment segment has a first length along a first direction; and a frequency adjustment segment located within the layout region and connected to the bandwidth adjustment segment along the second direction; wherein the frequency adjustment segment has a second length along the first direction, and the second length is greater than the first length;

wherein a three-dimensional sensing space is established by the antenna structure through a communication element.

16. The antenna structure according to claim 15, further comprising an auxiliary adjustment segment located within the layout region and connected to the frequency adjustment segment, wherein the auxiliary adjustment segment has a third length along the first direction, and the third length is less than the first length; wherein the ring-shaped segment has a circumference, the first length is less than or equal to 12.5% of the circumference, and the second length is less than or equal to 25% of the circumference.

17. The antenna structure according to claim 16, wherein a reference axis is defined to be parallel to the first direction and passing through the gap, at least 90% of the bandwidth adjustment segment is located at one side of the reference axis, and the ring-shaped segment is mirror-symmetrical to the reference axis.

18. The antenna structure according to claim 15, wherein a distance between the first end portion and the second end portion is less than or equal to 1% of the circumference of the ring-shaped segment; wherein the auxiliary adjustment segment faces the second end portion along the first direction, and a slit being in spatial communication with the gap is formed between the auxiliary adjustment segment and the second end portion.

19. An antenna system, comprising:

an antenna device, comprising:

an antenna structure, comprising:

a ring-shaped segment having a first end portion, a second end portion spaced apart from the first end portion, and a surrounding portion connected between the first end portion and the second end portion; wherein a gap is formed between the first end portion and the second end portion, and the first end portion, the second end portion, and the surrounding portion jointly define a layout region communicating with the gap;

a bandwidth adjustment segment located within a corner of the layout region that is jointly defined by the first end portion and a part of the surrounding portion adjacent to the first end portion; wherein the bandwidth adjustment segment is connected to the first end portion along the first direction and the part of the surrounding portion along a second direction that is perpendicular to the first direction, and wherein the bandwidth adjustment segment has a first length along a first direction; and a frequency adjustment segment located within the layout region and connected to the bandwidth adjustment segment along the second direction; wherein the frequency adjustment segment has a second length along the first direction, and the second length is greater than the first length; and a communication element electrically connected to the first end portion and the second end portion of the ring-shaped segment of the antenna structure; wherein a three-dimensional sensing space is established by the antenna structure through the communication element; and a plurality of sensors respectively placed in a plurality of independent chambers, wherein the antenna device is able to obtain signals from the plurality of sensors.

20. The antenna system according to claim 19, wherein the antenna device does not obtain signals from any external sensor.

* * * * *